United States Patent Office 3,035,104
Patented May 15, 1962

3,035,104
PROCESS FOR THE PRODUCTION OF ALPHA OLEFINS
Ronald G. Harvey, Chicago, William D. Hoffman, Park Forest, and Seymour H. Patinkin, Chicago, Ill., assignors, by mesne assignments, to Sinclair Research, Inc., New York, N.Y., a corporation of Delaware
No Drawing. Filed Dec. 10, 1959, Ser. No. 858,602
4 Claims. (Cl. 260—683.15)

This invention relates to the polymerization of ethylene to yield olefins with a high percentage of straight chain terminal monoolefins.

Polymerization processes utilizing $AlR_3$ catalysts are well known, having been explored by Ziegler and his associates (see for example, German Patent 878,560 and U.S. Patent No. 2,781,410). Ziegler discloses that trialkyl aluminum reacts with ethylene in a so-called "growth" reaction step to produce tri-n-alkyl aluminum compounds with chain lengths determined primarily by the amount of ethylene absorbed.

For example, the growth reaction of trialkyl aluminum and ethylene takes place according to the following formula:

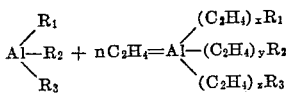

wherein $R_1$, $R_2$ and $R_3$ are similar or dissimilar lower alkyl radicals, preferably of 2 to 4 carbon atoms, and $x+y+z=n$. Usually $n$ is about 6 to 30.

It was also discovered by Ziegler that in the presence of colloidal metal catalysts such as nickel, cobalt or platinum, the alkyl residues, i.e. the $—(C_2H_4)_xR_1$, $—(C_2H_4)_yR_2$, and $—(C_2H_4)_zR_3$, in the above formula can be displaced by ethylene to thereby produce terminal olefins and trialkyl aluminum. These metal catalysts, however, have been found to catalyze rearrangement of the double bond in the olefinic reaction products so that large amounts of internal olefins contaminate the normal terminal olefins. Consequently, it has been found necessary, as disclosed by Ziegler in U.S. Patent No. 2,781,410, to poison these active catalysts with acetylene compounds so as to decrease their tendency to isomerize double bonds. This treatment of the catalysts decreases their activity and necessitates the use of higher temperatures in the reaction in order to obtain high percentages of terminal olefins.

It has now been discovered that high percentages of straight chain terminal olefins can be produced at low temperatures and without the assistance of acetylene compounds by reacting aluminum trialkyl growth products with ethylene in the presence of small amounts of finely divided iron and nickel for a time sufficient for the ethylene to displace the alkyl groups combined with the aluminum. Generally the time required for the displacement reaction is at least about 1 hour.

In accordance with the preferred method of the present invention a compound having the basic formula $AlR_1R_2R_3$ (wherein $R_1$, $R_2$ and $R_3$ can be similar or dissimilar alkyls) is first built up by reacting $n$ molecules of ethylene at a temperature between about 60 and 120° C. in the absence of a catalyst to a compound having the general formula:

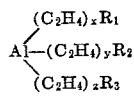

(wherein $x+y+z=n$). By a suitable choice of the quantity of ethylene used is it possible to adjust the average molecular weight of the alkyl groups combined with the aluminum to the desired extent. The resulting aluminum trialkyl growth product is then reacted with ethylene in the presence of about .01–1.0 mol percent of finely divided iron, preferably about 0.1 to 0.5 mol percent and about .001 to .01 mol percent, preferably about .001 mol percent of finely divided nickel at a temperature of about 40 to 100° C., preferably about 55 to 75° C., usually at a pressure of about 50–5000 p.s.i.g., preferably about 500–1500 p.s.i.g., and for a time sufficient to displace the alkyl groups combined with the aluminum. The amounts of catalyst are based upon the growth product feed. The reaction product of this second step comprises a mixture of aluminum triethyl and alpha olefins having the general formula:

$$CH_2=CH—(C_2H_4)_{x-1}R_1$$
$$CH_2=CH—(C_2H_4)_{y-1}R_2$$
$$CH_2=CH—(C_2H_4)_{z-1}R_3$$

wherein $x+y+z=n$, that is equal to the number of mols of ethylene used in the growth reaction per mol of the original aluminum compound, and $R_1$, $R_2$ and $R_3$ represent alkyls which may be similar or dissimilar. Generally the terminal olefins in the final reaction product will range from about 80 to 95%. The removal of the aluminum triethyl formed often presents some difficulty since many of the olefins produced may be of the same boiling range.

A convenient separation can be carried out by distilling off the displaced terminal olefins, recycling the mixture of aluminum triethyl and conflicting olefins of similar boiling range, building up the aluminum triethyl once again with ethylene into high molecular weight aluminum and distilling off the conflicting terminal olefins.

The greatest efficiencies can be obtained from the catalyst of the present invention if the metals are employed in a colloidal state. The iron-nickel catalyst of the present invention can be prepared in a colloidal state by mixing iron and nickel salts with aluminum trialkyl. The aluminum trialkyls reduce the ferric iron and nickel to colloidal iron and nickel. Suitable salts, for instance, are the ferric and nickel chelates such as ferric and nickel acetylacetonate.

In the $AlR_3$ reactants the R substituent may be the same or different and are generally selected from monovalent aliphatic hydrocarbon radicals of 2 to 8 carbon atoms. The preferred $AlR_3$ is aluminum triethyl.

The following examples will serve to illustrate the present invention.

EXAMPLE I

A 500 ml. magna dash was cleaned, flushed with pure nitrogen and pressure tested. To this autoclave was added 127 g. of triethyl aluminum (90% purity from Ethyl Corporation). The autoclave was heated to 115° C. and pressured to 600 p.s.i.g. with C.P. ethylene which had been passed through a chemical trap to remove impurities. The up-take of ethylene began immediately. The reaction was stopped after sufficient ethylene had been absorbed to give a distribution of product with a $C_8$ average carbon number. The autoclave was cooled and 1 g. of butene removed under reduced pressure. The contents of the autoclave were removed and stored in a pressure container until needed for the displacement reaction. A total yield of 419 g. was obtained.

A 94 g. portion (=0.21 mole) of the above growth products was transferred to an evacuated 500 ml. magna dash unit. Colloidal iron and nickel are prepared in situ by adding, respectively 151 mg. (=0.2 mole percent) of ferric acetylacetonate and .001 mole percent nickel acetylacetonate in benzene to the growth products.

Iron acetylacetone can be prepared from ferric hydroxide and acetylacetone and nickel acetylacetonate from nickel hydroxide and acetylacetone.

Displacement was then carried out with ethylene at 500 p.s.i.g./64° C. Absorption of ethylene was relatively rapid at first then become slower until after 85 minutes the theoretical amount of ethylene was absorbed and no further uptake of gas was observed. The lower boiling olefins were removed from the product under reduced pressure. The triethyl aluminum and olefins of similar boiling range are recycled to the reaction zone and contacted with ethylene at a temperature between 60 and 120° C. to convert the triethyl aluminum to higher molecular weight aluminum compounds and the olefins distilled off. A 10 g. sample of the combined olefin product (80 g.) was fractionated by vapor phase chromatography and the cuts analyzed by infrared analysis. The products, $C_4=$ to $C_{10}=$, ranged from 88.5 percent to 91.7 percent terminal olefins. The remainder was essentially all reported as trans internal olefin.

EXAMPLE II

Using 94 g. (=0.21 mole) of the growth products (Example I), 0.1 mole percent of the iron acetylacetonate and 0.001 mole percent of nickel acetylacetonate, a displacement reaction was carried out at a pressure of 490 p.s.i.g. and a temperature of 50° C. After absorption of the theoretical amount of ethylene, the products were removed and worked up as in Example I. The products, $C_4=$ to $C_{10}=$, ranged from 84.2 to 91.9 percent terminal olefins.

The iron acetylacetonate employed in this example was prepared from ferrous hydroxide and acetylacetone. The recrystallized product had a molecular weight of 290 instead of the theoretical 254 for ferrous acetylacetonate. The melting point was 180° C. which is close to the value obtained for the ferric compound. Apparently this material was an impure ferric acetylacetonate.

EXAMPLE III

Acetylacetonates of nickel, cobalt and palladium were prepared by standard methods. Using 94 g. (=0.21 mole) of the growth product of Example I and the indicated amounts of the metal acetylacetonates a displacement reaction was carried out at 60° C. and a pressure of 500 p.s.i.g. The results are shown in Table I.

*Table 1*

DISPLACEMENT REACTION [1]

| Metal | Fe+Ni | Ni | Co | Pd |
|---|---|---|---|---|
| Quantity (mole percent) | 0.2 (Fe) and 0.001 (Ni) | 0.5 | 0.1 | 0.1 |
| Time of completion of displacement (mins.) | 85 | 20 | 10 | 7 |
| Percent Terminal Olefin ($C_4=$ to $C_{10}=$range) | 88.5–91.7 | 60–70 | 73–90 | 74.3–78.3 |
| $C_4=$ | 90 | | 90 | |
| $C_6=$ | 88.3–91.5 | | 83.5 | |
| $C_8=$ | 83.2 | | 68.9 | |
| $C_{10}=$ | 91.8 | | 63.7 | |

[1] Conditions 60° C., 500 p.s.i.g.

As shown in Table I, although the rate of displacement is slower when using the catalyst of the present invention than when using colloidal nickel, cobalt or palladium, the product distribution is advantageously improved. Again, it is emphasized that the high percentage of terminal olefins produced is obtained without the assistance or presence of acetylene compounds.

The olefins produced by the process of the present invention are particularly useful intermediates for the production of crystalline poly-alpha-olefins, homopolymers and copolymers, detergents, terminal epoxides, fatty acids and in general straight chain aliphatic products with terminal functional groups.

It is claimed:

1. In a process for preparing liquid olefins the step which comprises contacting a trialkyl aluminum-ethylene addition product with ethylene in the presence of about .01 to 1.0 mol percent of finely divided iron and about 0.001 to 0.01 mol percent of finely divided nickel at a temperature of about 40 to 100° C., for a time sufficient to form normal terminal monoolefins, said addition product having the formula:

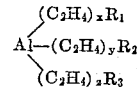

wherein $R_1$, $R_2$ and $R_3$ are lower alkyl radicals and $x+y+z$ equals about 6 to 30.

2. The process of claim 1 wherein about 0.1 to 0.5 mol percent of colloidal iron and about 0.01 to 0.001 mol percent of colloidal nickel is employed.

3. The process of claim 1 wherein the aluminum trialkyl is aluminum triethyl.

4. In a process for preparing liquid olefins the step which comprises contacting a trialkyl aluminum-ethylene addition product with ethylene in the presence of about 0.1 to 0.5 mol percent colloidal iron and about 0.001 to 0.01 mol percent of colloidal nickel at a temperature of about 55 to 75° C., a pressure of about 500 to 1500 p.s.i.g. for a time sufficient to form normal terminal monoolefins, said addition product having the formula:

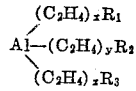

wherein $R_1$, $R_2$ and $R_3$ are lower alkyl radicals and $x+y+z$ equals about 6 to 30.

References Cited in the file of this patent

UNITED STATES PATENTS 2,781,410  Ziegler et al. _____ Feb. 12, 1957